United States Patent
Agrawal et al.

(10) Patent No.: US 7,983,487 B2
(45) Date of Patent: Jul. 19, 2011

(54) METHOD AND SYSTEM FOR LOCATING AND PICKING OBJECTS USING ACTIVE ILLUMINATION

(75) Inventors: Amit K. Agrawal, Somerville, MA (US); Ramesh Raskar, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 923 days.

(21) Appl. No.: 11/936,416

(22) Filed: Nov. 7, 2007

(65) Prior Publication Data
US 2009/0116728 A1 May 7, 2009

(51) Int. Cl.
*G06K 9/00* (2006.01)
*G06K 9/34* (2006.01)
*G06K 9/40* (2006.01)
*G06T 15/50* (2006.01)
*G09G 5/00* (2006.01)

(52) U.S. Cl. ........ 382/199; 382/153; 382/154; 382/173; 382/254; 345/426; 345/582

(58) Field of Classification Search .................. 382/100, 382/153, 103, 154, 174, 162, 190, 173, 195, 382/199, 224, 254, 285, 232, 274, 164, 171; 345/419, 418, 426, 582, 629; 348/571, 578, 348/584, 586; 342/70, 71; 396/661
See application file for complete search history.

(56) References Cited

U.S. PATENT DOCUMENTS

| 5,227,985 | A  | * | 7/1993  | DeMenthon ................ 702/153 |
| 5,297,061 | A  | * | 3/1994  | Dementhon et al. .......... 345/180 |
| 6,064,749 | A  | * | 5/2000  | Hirota et al. ................ 382/103 |
| 6,295,367 | B1 | * | 9/2001  | Crabtree et al. ............. 382/103 |
| 6,978,167 | B2 | * | 12/2005 | Dekel et al. ................. 600/426 |
| 7,088,845 | B2 | * | 8/2006  | Gu et al. ..................... 382/103 |
| 7,142,726 | B2 | * | 11/2006 | Ziegler et al. ............... 382/285 |
| 7,162,055 | B2 | * | 1/2007  | Gu et al. ..................... 382/103 |
| 7,218,792 | B2 | * | 5/2007  | Raskar et al. ................ 382/199 |
| 7,720,282 | B2 | * | 5/2010  | Blake et al. ................. 382/173 |
| 7,760,956 | B2 | * | 7/2010  | Lin et al. .................... 382/254 |

FOREIGN PATENT DOCUMENTS

| JP | 2000-194859 | 7/2000 |
| JP | 2005-100466 | 4/2005 |
| JP | 2005-341569 | 12/2005 |
| JP | 2007-098567 | 4/2007 |

\* cited by examiner

*Primary Examiner* — Sheela Chawan
(74) *Attorney, Agent, or Firm* — Dirk Brinkman; Gene Vinokur

(57) ABSTRACT

A method and system determines a 3D pose of an object in a scene. Depth edges are determined from a set of images acquired of a scene including multiple objects while varying illumination in the scene. The depth edges are linked to form contours. The images are segmented into regions according to the contours. An occlusion graph is constructed using the regions. The occlusion graph includes a source node representing an unoccluded region of an unoccluded object in scene. The contour associated with the unoccluded region is compared with a set of silhouettes of the objects, in which each silhouette has a known pose. The known pose of a best matching silhouette is selected as the pose of the unoccluded object.

18 Claims, 3 Drawing Sheets

METHOD AND SYSTEM FOR LOCATING AND PICKING OBJECTS USING ACTIVE ILLUMINATION

FIELD OF THE INVENTION

The present invention relates generally to a 3-dimensional object detection and recognition, and more particularly to determining the pose of objects. The tangible output of our method, that is the pose of objects, enables a number of useful applications, particularly for bin picking machines in manufacturing setting.

BACKGROUND OF THE INVENTION

Industrial robots are typically designed to perform the same task repeatedly with high accuracy and precision. In several industrial applications such as manufacturing and assembly, robots are used to 'pick' parts from a bin (part acquiring) and place the parts in a correct position and orientation (pose) for subsequent processing.

Robots rely on a consistent pose of the parts to be picked. Any deviation results in damage of the robot or part, which increases costs. Typically, custom designed mechanical and electromechanical systems are used to feed parts in specific pose to the robot. In some cases, the parts are pre-positioned manually so that the robot can easily pick up the parts.

More recently, computer vision techniques have been used to automate the process of part location and picking. Most conventional automated techniques can only pick a single non-occluding part, or parts lying apart from others, e.g., parts loosely scattered on a conveyor belt.

Some vision-assisted systems can pick stacked parts, but only using sophisticated mechanical systems or manual intervention. Most of vision-assisted systems lack reliability, accuracy and robustness and use expensive vision sensors and hardware. Conventional vision-assisted systems lack the capability of 3D part acquisition, when parts are placed randomly, in a haphazard manner on top of each other in a pile or a bin.

The problem of 3D pose estimation and part acquisition is well known. Manual part acquisition involves humans to acquire and place for assembly. This is a risk for humans working with heavy parts. In addition, a certain level of skill set is required from the human operators. It is desired to reduce costs by replacing human operators.

Automated part acquisition systems typically use electromechanical devices such as a robot arm equipped with a specially designed grasper for the parts to be picked. However, the robot needs to know the pose of the part to be picked. Methods such as precision fixturing could be used to present the part in a specific pose to the robot arm. These systems are costly, lack interoperability, i.e., the systems need to be designed specifically for a given part, and cannot handle a bin of randomly stacked parts.

Computer vision systems can be used to determine the pose of objects. Those systems typically use one or more cameras. Images acquired by the cameras can be analyzed to locate the objects and to provide feedback to the robot arm for subsequent operations. Most vision systems are 2D and can only be used for 2D tasks such as inspection, and simple part acquisition. Those systems cart only determine an in-plane orientation and location of the part, but cannot determine any out-of-plane rotation and the distance to the part. Typically, those 2D systems require parts to be non-overlapping and placed on a flat surface. Thus, those systems cannot operate on pile of randomly placed objects.

Some systems augment the 2D vision system by basing the distance to the object on a size of the object in an image. However, those 2.5D system cannot estimate the out of plane rotation, and are often unreliable in their distance estimates.

3D vision systems typically use sensors for estimating the 3D geometry of the scene. A stereo system uses two camera to estimate distance to an object. First, corresponding features are located in the stereo images. The geometric relationship between the cameras can be use to identify the depth (distance) of the features. However, locating corresponding features itself is a challenging problem, especially for machines parts, which are often highly reflective and homogeneous in appearance. Stereo systems can erroneously estimate depth if the images are noisy with respect to the features. Another problem with stereo systems is that the depths are recovered only for the features and not over the entire object. The reduced accuracy is insufficient for accurate bin-picking.

Laser triangulation uses structured light to generate a pattern on the surface of an object whole images are acquired by a camera. Laser triangulation can recover the 3D shape of the object surface. That technology has been used for applications involving edge tracking for welding, sealing, glue deposition, grinding, waterjet cutting and debarring of flexible and dimensionally unstable parts, for example.

Laser triangulation requires image registration and accounting for shadows and occlusions. Those systems have not yet been perfected for general, random bin-picking applications. In addition, lasers often leads to safety issues when deployed in close proximity of human operators.

SUMMARY OF THE INVENTION

The embodiments of the invention provide a system and method for detecting and recognizing objects in a scene. Furthermore, the embodiments determine a 3D pose of each object. The pose is defined herein as the 3-dimension location and orientation of the object.

In an example of a practical application, the objects are piles on top of each other in a bin. The object that is nearest to the camera is on top of the pile and can be picked out of the bin without disturbing the other objects.

Images are acquired of the scene by a camera while the scene is illuminated with a light source. The light source casts shadows. The shadows are used to obtain depth edges and shadow edges of the objects in the scene. The depth edges are linked using physical and geometric constraints between the depth edges and the shadow edges, resulting in closed contours. The contours are used to segment the image scene into regions.

An "occlusion graph" is constructed. The graph has one node for each segmented region. Two nodes are connected by an edge if a region associated with one node casts a shadow on (occludes) a region associated with the other node. The occlusion graph identifies unoccluded objects in the scene. Unoccluded objects correspond to objects on top of the pile, which have complete connected contours.

A database (memory) of object silhouettes is generated using a 3D computer aided design (CAD) model of the objects. The silhouettes are for different views. The database also includes partial silhouettes of the object for the different view. The silhouettes are also expressed as depth edges.

The occlusion graph is traversed to find potential candidate unoccluded objects. The contours of the top-level (unoccluded) object are matched with the silhouettes of the database to estimate the 3D position and orientation (3D pose) of the unoccluded object.

The estimated 3D pose could be used in conjunction with a robot arm for several robotic tasks, including part acquisition for handling or assembly. The system enables unconstrained 3D bin-picking.

DETAILED DESCRIPTION OF THE PREFERRED EMBODIMENT

System Structure

Figure 1:
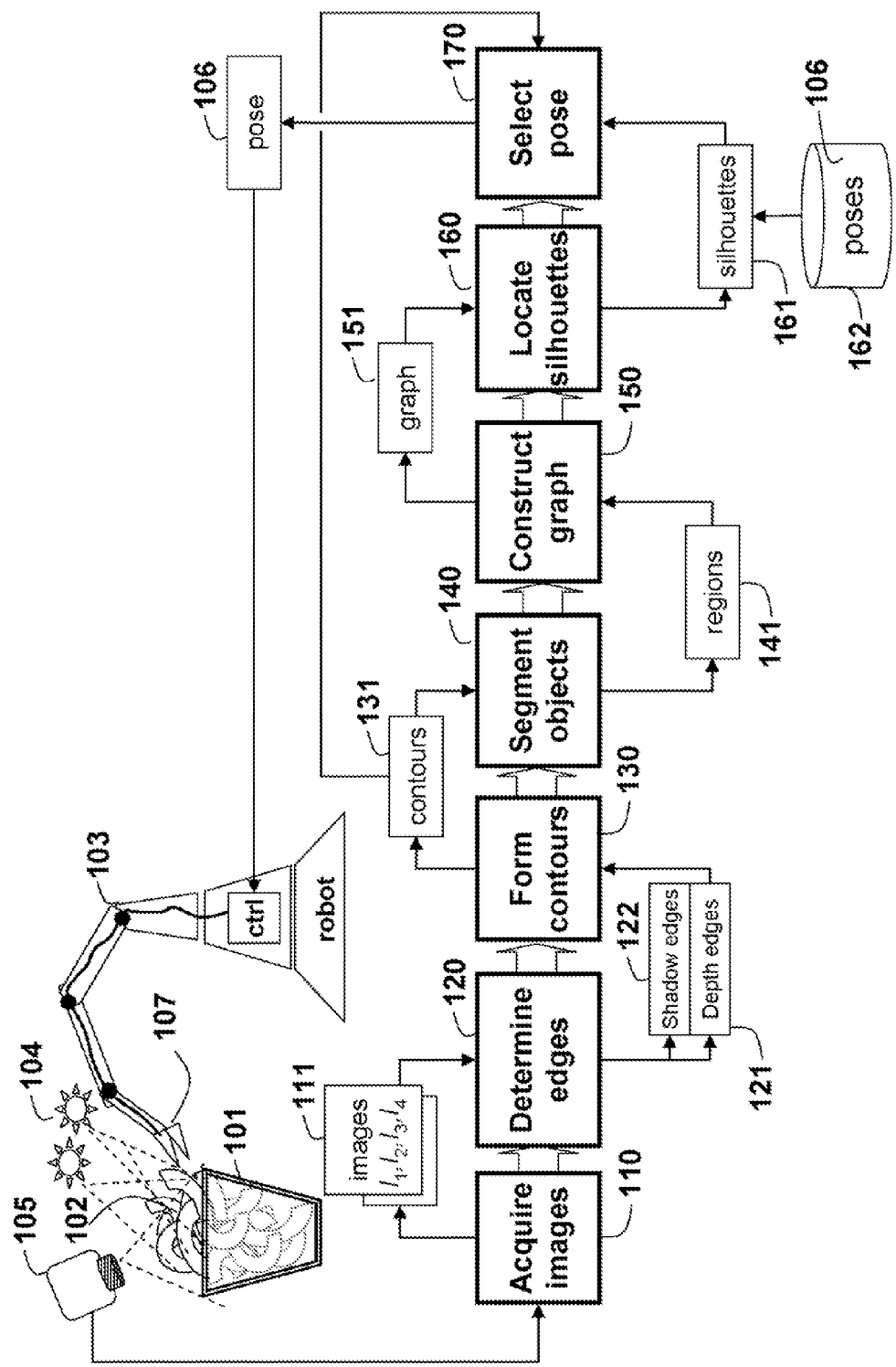
FIG. 1 is a block diagram of a system and method for locating and picking objects according to embodiments of the invention.

FIG. 1 shows a system and method for locating and picking objects according to embodiments of our invention. In one embodiment of the invention, the objects are similar in appearance and shape. In another embodiment, the objects are different.

Figure 2:
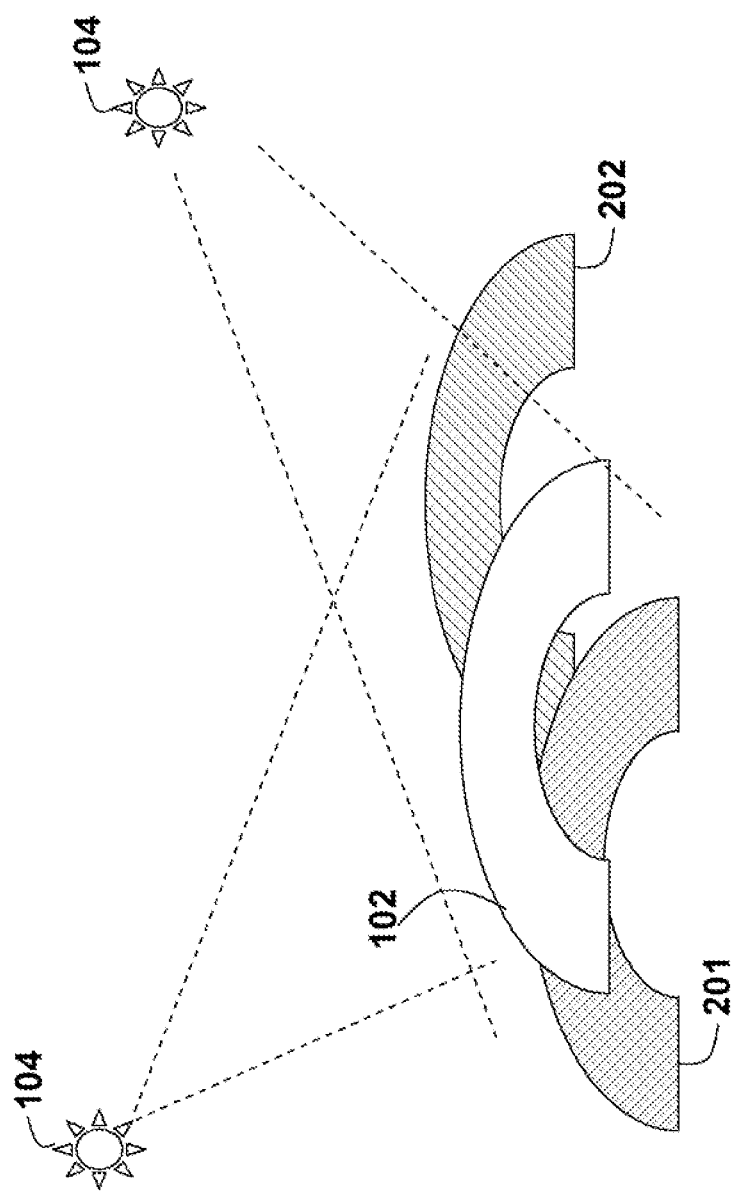
FIG. 2 is a schematic of an abject and shadows cast by the object according to embodiments of the invention.

A bin 101 contains objects 102 to be picked by a robot 103. The bin is illuminated by multiple light sources 104. The light sources cast various shadows in the bin. A camera 105 acquires 110 a set (multiple) images 111 of the objects in the bin while the illumination is varied. For example as shown in FIG. 2, the shadows 201-202 can be either side of the object 102 depending on the position of the light sources 104.

Depth edges 121 and shadow edges 122 due to shadows 201-202 in the images 111 are determined 120. The depth edges 121 are linked to form 130 connected contours 131. The contours are used to segment 140 the image into regions 141. The regions 141 are then used to construct 150 an occlusion graph 151.

The graph is used to locate 160 silhouettes 161 in a pre-stored database (memory) 162. The silhouettes are also in the form of depth edges. Each silhouette has an associated pose 106. The pose 106 of the silhouette 161 in the database that best matches the contour 131 of an unoccluded object according to the graph is selected 170 is the pose of an object in the bin. The robot 103 uses the poses to pick objects out of the bin for further processing.

Method Operation

Image Acquisition

The set (multiple) images 111 are acquired 110 by one or more cameras 105. The cameras can be video cameras or still photo camera. The cameras can be arranged on the robot arm 107, or fixed in a workspace near the robot and bin. The images are acquired with light sources 104. The light sources can be light emitting diodes (LEDs), or other types of lighting devices, placed near the camera or in the workspace. A configuration of the light sources with respect to the camera is determined for calibration purposes. In our current implementation, we use a multiflash camera, see U.S. Pat. No. 7,218,792 issued to Raskar, incorporated herein, by reference.

An ambient image is also acquired when the scene is illuminated only by ambient light. The ambient image is subtracted from each image in the set to cancel the effect of the ambient light.

Depth and Shadow Edges Determination

After the images are acquired, we determine the depth edges 121 and the shadow edges 122 of the objects in the bin. A depth edge is defined as a discontinuity between a boundary off the object and the background. A shadow edge is defined as a discontinuity between the shadow cast by the object and the background.

Typically, industrial objects have non-Lambertian reflectance and specularities, which lead to noise and spurious depth edges. Non-Lambertian surface are difficult to deal with because the luminance of the changes with the viewing angle. Our method can also deal with objects with holes. Similar to self-shadowing, our method can ignore the effect of specular highlights when spurious depth edges due to specularities are present, by removing those spurious depth edges.

For simplicity of this description, the set includes four varying illuminated images $I_1, I_2, I_3, I_4$ are acquired by placing the light sources above, below, and to the left and right of the camera. We determine an intrinsic image, $I_{median}$ from the set of images by determining the median of the gradient at every pixel and reconstructing back from the gradients, see Raskar.

Then, each image $I_i$ is replaced by $I_i = \min(I_i, I_{median})$. That is, at every pixel in the image $I_i$, the intensity value is replaced by the minimum of the intensity value or the median value $I_{median}$. Next, we obtain ratio images $I_R = I_i / I_{median}$. The effect of this operation is to minimize specularities in the images.

The edges are detected in the ratio images. The edges correspond to depth or shadow edge depending on the direction of the illumination for that image.

Contour Formation

The depth edges 121 can be incomplete, i.e., certain parts of the depth and shadow edges may be missing due to soft shadows, or lack of shadows. Heuristic methods for linking edges, which use Gestalt rules are known. However, we use physical and geometric constraints for edge linking instead of heuristics. The constraints are between the depth edges and the shadow edges. Cast shadows have a penumbra region and depth edges as defined above correspond to a discontinuity on one side of the penumbra, while the shadow edges correspond to a discontinuity on the other side of the penumbra. Therefore, we define two constraints:

1) For every depth edge, there exist a parallel shadow edge; and
2) A depth edge and shadow edge cannot coexist at the same pixel.

These two constraints enable us to complete missing depth edges to form closed contours. We achieve this by fitting line segments to the depth edges and extending each line segment. Every extended line segment, which conforms to the above constraints, is retained as a contour 131.

Segmentation

The contours 131 formed from the depth edges 121 segment the image into regions 141. Over-segmentation is corrected by merging, as described below.

Occlusion Graph Construction

Figure 3:
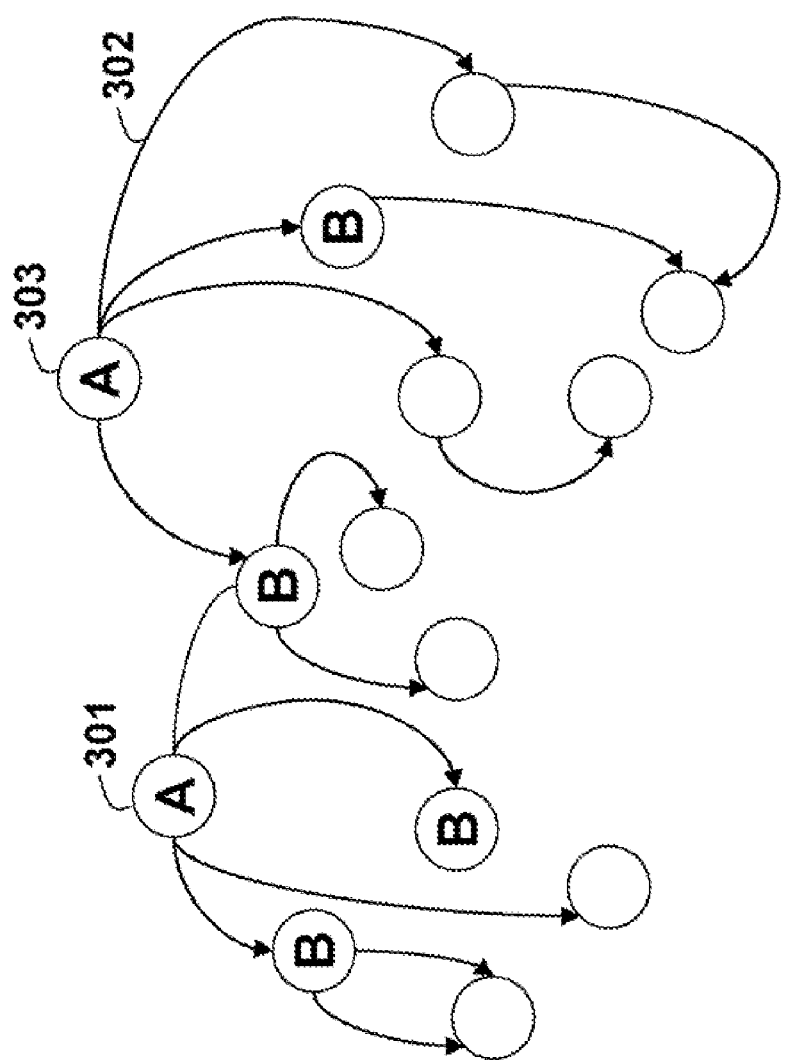
FIG. 3 is an occlusion graph according to an embodiment of the invention.

As shown in FIG. 3, the occlusion graph is defined as a 2D directed graph of nodes 310 and directed arcs 302. In the graph, the nodes represent the regions, and a directed arc runs from a first node to a second node when the region represented by the first node casts a shadow on the region of the second node. There may be a set of graphs for an image. For example, if there are two separate piles of objects, then we construct two occlusion graphs, one for each pile.

The occlusion graph is constructed as follows. Let A and B denote a pair of regions. The pair of regions is inserted in the graph as nodes. Then, we determine if region A casts a shadow on region B, and vice versa. If true, a directed arc connects node A and B in a direction of the cast shadow. If false, the regions can be merged and the nodes combined.

Locating Unoccluded Objects

The occlusion graph identifies unoccluded objects in the bin. A source node 303 is anode without an incoming directed arc. Source nodes must represent regions of unoccluded objects.

Pose Estimation

The pose estimation is a two stage process, first coarse, and second fine. The pose estimation uses the depth edges of silhouettes prestored in the database.

Preprocessing

The silhouettes of the object in different views are prestored in the database. For every view, partial silhouettes of the object are also stored in the database. The view yields the corresponding pose. The partial silhouettes help to match objects in presence of self-shadows and self occlusions. It is assumed that CAD models for the objects are readily available in manufacturing and assembly applications.

Coarse Pose Estimation

The contour associated with an unoccluded object, according to the graph, is matched with the silhouettes stored in the database to obtain the best matching pose. The matching can use any known technique such as chamfer matching or matching image moments. Because the number of silhouettes stored in database is finite, we can only obtain a coarse pose estimate.

Fine Pose Estimation

We refine the 3D pose using an entire 3D CAD model. The pose refinement is done using conventional techniques of optimizing for rotation and translation by matching the silhouettes of the 3D CAD model with the given region. This optimization starts from the coarse pose estimate and converges to the correct pose.

Object Picking

The pose can be used by the robot to pick the top-most object from the bin. If a particular image shows multiple unoccluded objects, these can be picked sequentially.

Multiple Object Types

The above method is described for similar objects when the database stores corresponding silhouettes for the different objects.

Multiple Image Acquisition

The above method is described for a single camera at a fixed viewpoint. However, the system can also be worked with multiple camera viewpoints. The additional images can then be used to verify the segmentation and pose estimation results. Alternatively, the information from multiple images can be combined to increase the accuracy of the pose estimation.

EFFECT OF THE INVENTION

The system and method according to embodiments of our invention determine the pose of unoccluded parts in a bin. The system uses a single camera equipped with inexpensive light emitting diodes (LED's). The pose can be fed to a robotic arm to pick the parts out of the bin in a manufacturing application. Because our method is relatively simple and fast to execute, it can be used with real-time applications.

Our invention performs 3D object recognition and poses estimation without the use of 3D acquisition devices such a stereo camera, laser lights or structure light. Reconstructing the depth map of a scene is time consuming and expensive, particularly for shiny industrial parts with specularities and non-Lambertian surfaces. The invented system does not estimate 3D depth. Instead, depth edges are obtained from cast shadows. The depth edges can be used as features for segmenting the scene and estimating the pose as opposed to commonly used features such as intensity edges, corners, and junctions.

The use of depth edges enables our system to work on both textured, non-textured, and shiny or specular objects. Systems that use features based on intensity edges have difficulty with shiny metallic industrial parts and non-textured objects.

The invention provides a novel edge linking process to complete missing depth edges in a scene. Traditional edge linking processes try to obtain closed contours from intensity image by completing intensity edges using heuristics. We use actual physical and geometric constraints link depth edges without using any heuristics.

We also provide a novel occlusion graph of the scene. The occlusion graph is constructed from regions enclosed by depth edges. Every node in the occlusion graph corresponds to a 2D region enclosed by depth edges. A directed arc exists between node A and node B if region A casts shadow on region B. The source nodes of the occlusion graph correspond to the un-occluded objects in the scene.

The graph reduces the number of matches that need to be performed to match objects with their silhouettes.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining 3D pose of an object in a scene, comprising:
    determining depth edges from a set of images acquired of a scene including a plurality of objects while varying illumination in the scene;
    linking the depth edges to form contours;
    segmenting the images into regions according to the contours;
    constructing an occlusion graph using the regions, in which the occlusion graph includes a source node representing an unoccluded region of an unoccluded object in the scene;
    comparing the contour associated with the unoccluded region with a set of silhouettes of the plurality of objects, in which each silhouette has a known pose; and
    selecting the known pose of a best: matching silhouette as the pose of the unoccluded object, the steps are performed by a processor.

2. The method of claim 1, further comprising:
    picking the unoccluded object from the scene according to the pose.

3. The method of claim 1, in which the picking is performed by a robotic arm.

4. The method of claim 3, in which the camera is arranged on the robot arm.

5. The method of claim 1, in which, the plurality of objects are similar in appearance and shape.

6. The method of claim 1, in which the objects have a non-Lambertian surface.

7. The method, of claim 1, in which the varying illumination is from light sources above, below, and left and right of the camera.

8. The method of claim 1, in which the camera is a video camera.

9. The method of claim 1, further comprising:
defining the depth edges as discontinuities between a boundary off the object and a background in the scene; and
defining the shadow edges as discontinuities between a shadow cast by the object and the background.

10. The method of claim 9, in which linking has constraints that there is a parallel shadow edge for each depth edge, and the depth edge and shadow edge cannot coexist at a same pixel in the set of images.

11. The method of claim 1, in which the plurality of objects include specularities.

12. The method of claim 11, in which the set of images are and further comprising:
determining an intrinsic image for each image $I_{median}$ from medians of gradient at each pixel in the set of images;
replacing each image $I_i$ by $I_i = \min(I_i, I_{median})$;
obtaining ratio images $I_i/I_{median}$; and
determining the depth edges from the ratio images to minimize the specularities.

13. The method of claim 1, in which a directed arc runs from a first node to a second node when a first region represented by the first node casts a shadow on a second region represented by the second node, and the source node does not have an incoming arc edge.

14. The method of claim 13, further comprising:
merging the first node and the second node if there is no arc between the first node and the second node.

15. The method of claim 3, in which the silhouettes and known poses are prestored in a memory or database.

16. The method of claim 3, in which the silhouettes and known poses are obtained from computer aided design model of different views of the plurality of objects.

17. The method of claim 1, in which the silhouettes include partial silhouettes.

18. The method of claim 1, in which the set of images are acquired by multiple cameras.

* * * * *